(12) United States Patent
Hannaway

(10) Patent No.: US 7,346,698 B2
(45) Date of Patent: Mar. 18, 2008

(54) WEBCASTING METHOD AND SYSTEM FOR TIME-BASED SYNCHRONIZATION OF MULTIPLE, INDEPENDENT MEDIA STREAMS

(75) Inventor: G. Wyndham Hannaway, Boulder, CO (US)

(73) Assignee: G. W. Hannaway & Associates, Boulder, CO (US)

( * ) Notice: Subject to any disclaimer, the term of this patent is extended or adjusted under 35 U.S.C. 154(b) by 466 days.

(21) Appl. No.: 09/742,165

(22) Filed: Dec. 20, 2000

(65) Prior Publication Data

US 2002/0103919 A1   Aug. 1, 2002

(51) Int. Cl.
 G06F 15/16   (2006.01)
(52) U.S. Cl. ............... 709/231; 725/87; 348/14.07; 370/230; 370/231; 370/232; 370/233; 370/234
(58) Field of Classification Search ............. 709/231; 348/385, 14.12, 14.07; 370/465, 230–235; 725/87–96
See application file for complete search history.

(56) References Cited

U.S. PATENT DOCUMENTS

| | | | | |
|---|---|---|---|---|
| 4,587,651 | A | * | 5/1986 | Nelson et al. ............... 370/405 |
| 4,598,397 | A | * | 7/1986 | Nelson et al. ............... 370/468 |
| 4,833,673 | A | * | 5/1989 | Chao et al. .................. 370/537 |
| 5,313,454 | A | * | 5/1994 | Bustini et al. ............... 370/231 |
| 5,333,299 | A | | 7/1994 | Koval et al. ................. 395/550 |
| 5,394,106 | A | * | 2/1995 | Black et al. ................. 327/107 |
| 5,533,021 | A | * | 7/1996 | Branstad et al. ............. 370/396 |
| 5,559,562 | A | | 9/1996 | Ferster |
| 5,565,924 | A | | 10/1996 | Haskell et al. |

(Continued)

FOREIGN PATENT DOCUMENTS

GB   2 327 548 A   1/1999

(Continued)

OTHER PUBLICATIONS

"First Generation of True HDTV Component Products and Advanced Line of Analog Projection Televisions Unveiled by Mitubushi Consumer Electronics America", Mitsubishi, 1999.*

(Continued)

*Primary Examiner*—Bunjob Jaroenchonwanit
*Assistant Examiner*—Duyen M Doan
(74) *Attorney, Agent, or Firm*—Marsh Fischmann & Breyfogle LLP; Kent A. Lembke (57) ABSTRACT

A method for time-based synchronization of multiple media streams transmitted over a communications network, such as the Internet, by multiple, independent streaming media sources. First and second media streams of data packets are received from first and second media sources. Timing data is parsed from the two media streams, and first and second transmission delay values are determined by comparing the timing data with a reference time. A synchronized media stream is created by combining the first and second media streams into a time-synchronized media stream with adjustments to correct for calculated transmission delay values. Feedback signals are sent to the media sources to control transmission variables such as stream length, transmission rate, and transmittal time to manage the variable delay at the media source. The first and second media streams are decoded into intermediate media streams compatibly formatted to allow mixing of the streams and data packets.

23 Claims, 2 Drawing Sheets

U.S. PATENT DOCUMENTS

| | | | | |
|---|---|---|---|---|
| 5,596,420 | A * | 1/1997 | Daum | 386/110 |
| 5,612,742 | A * | 3/1997 | Krause et al. | 375/240.25 |
| 5,623,483 | A | 4/1997 | Agrawal et al. | 370/253 |
| 5,633,683 | A | 5/1997 | Rosengren et al. | |
| 5,661,665 | A | 8/1997 | Glass et al. | 348/423 |
| 5,832,085 | A * | 11/1998 | Inoue et al. | 386/124 |
| 5,844,600 | A | 12/1998 | Kerr | 348/14.12 |
| 5,847,771 | A | 12/1998 | Cloutier et al. | 348/564 |
| 5,877,812 | A * | 3/1999 | Krause et al. | 375/240.25 |
| 5,903,563 | A * | 5/1999 | Rashid et al. | 370/395.65 |
| 5,914,757 | A * | 6/1999 | Dean et al. | 348/584 |
| 5,918,020 | A | 6/1999 | Blackard et al. | 395/200 |
| 5,930,473 | A | 7/1999 | Teng et al. | 395/200 |
| 5,941,951 | A | 8/1999 | Day et al. | 709/233 |
| 6,006,241 | A | 12/1999 | Purnaveja et al. | 707/512 |
| 6,009,457 | A | 12/1999 | Moller | 709/203 |
| 6,049,569 | A | 4/2000 | Radha et al. | 375/240 |
| 6,052,554 | A * | 4/2000 | Hendricks et al. | 725/109 |
| 6,097,422 | A | 8/2000 | Aref et al. | 348/7 |
| 6,115,422 | A * | 9/2000 | Anderson et al. | 375/240 |
| 6,122,020 | A * | 9/2000 | Abe et al. | 375/240.28 |
| 6,134,379 | A * | 10/2000 | LaMacchia | 386/54 |
| 6,137,834 | A | 10/2000 | Wine et al. | |
| 6,154,501 | A * | 11/2000 | Friedman | 375/260 |
| 6,157,659 | A * | 12/2000 | Bird | 370/538 |
| 6,230,172 | B1 * | 5/2001 | Purnaveja et al. | 715/512 |
| 6,360,271 | B1 * | 3/2002 | Schuster et al. | 709/231 |
| 6,744,815 | B1 * | 6/2004 | Sackstein et al. | 375/240 |
| 6,922,731 | B1 * | 7/2005 | Morioka et al. | 709/231 |
| 6,934,759 | B2 * | 8/2005 | Hejna, Jr. | 709/231 |
| 7,043,749 | B1 * | 5/2006 | Davies | 725/120 |
| 2002/0129374 | A1 * | 9/2002 | Freeman et al. | 725/91 |

FOREIGN PATENT DOCUMENTS

WO     WO 97/08898     3/1997

OTHER PUBLICATIONS

Google Definition of "Multiplex", date unknown.*
Google Definition of "Mixing", date unknown.*
PCT International Search Report, PCT/US 01/42216 (Apr. 8, 2002).
Borko Furht, "Multimedia Systems: An Overview," 8440 IEEE MultiMedia, 1 (1994) Spring, No. 1, Los Alamitos, CA, US.

* cited by examiner

WEBCASTING METHOD AND SYSTEM FOR TIME-BASED SYNCHRONIZATION OF MULTIPLE, INDEPENDENT MEDIA STREAMS

BACKGROUND OF THE INVENTION

1. Field of the Invention

The present invention relates generally to the field of transmitting digital data over a communications network, such as the Internet, and more particularly, to methods and systems of processing, combining, and mixing streaming media, especially video-based media, being received from multiple sources at differing locations into one or more time-synchronized media streams that are corrected or adjusted for variable transmission delays experienced during transmissions over communications networks.

2. Relevant Background

Webcasting or Internet broadcasting is a promising and rapidly expanding use for digital communication networks, such as the Internet. In general, webcasting is the Internet equivalent of analog television and radio broadcasting and involves the transmittal of media streams (or streaming media) comprising packets (i.e., data encoded in binary form to comply with a network transport protocol, such as Internet Protocol (IP), complete with headers having timing, identifying, and other information) of audio, video, animation, text, and the like. Once transmission begins, the packets are streamed or transmitted on an ongoing basis so that the end-user or receiving party can begin to use (i.e., hear, see, and otherwise use) the data before downloading an entire file. While bandwidth and other capacity limitations previously limited webcasting to providing audio and other lower capacity-requiring media, recent and expected advances in end-user computers, Internet connections, and media server hardware (such as the availability of 100 Kbps or faster connections) are enabling webcasters to deliver real time video content, too. Expected hardware and infrastructure advances will soon allow the delivery of entertainment quality, video-based media streams over the Internet and other communication networks to a significant number of end-users (e.g., residential computer and Internet users). With ever-increasing bandwidths, webcasters will most likely soon be able to compete for the audiences currently captured by traditional radio and television broadcasters.

Unfortunately, a number of problems and challenges make it very difficult for webcasted media to duplicate the fast-paced programming features and overall quality levels that are being achieved by broadcasters in the mature medium of television. For example, streaming media transmitted over a public communications network, especially one as large as the Internet, typically experiences variable transmission rates, and even varying rates for individual packets within a stream, due to packet collisions, congestion on the network, routing equipment delays, and other network reliability problems. These variable or non-deterministic delays make it difficult for a webcaster to coordinate multiple independent streams to avoid dead air or space when breaking between two media streams (i.e., to identify the "edit points" representing the beginning and ending of shows or portions of shows or files). Additionally, the variable delays can result in the end user or viewer seeing a jerky picture or hearing jitters in the received data and, when combined, related video and audio streams may not be properly time-correlated. Unlike deterministic delays, such as experienced for uplinking and downlinking satellite feeds in traditional television broadcasting, these variable transmission rates result in variable or non-deterministic delays that are difficult to overcome and which make programming webcasts problematic, especially those involving multiple sources and live webcast content.

Some efforts have been made to address variable delay in related audio and video data streams in an attempt to achieve synchronization (e.g., lip-synch) between the related streams. Others have addressed the variable delay problem in live and "taped" broadcasts by selectively serving or delivering the streaming media from a server located relatively near the end-user to minimize network delays and delay variability. Unfortunately, such a server-heavy system requires a large number of dedicated media servers. Additionally, neither of these approaches addresses the need for time-based synchronization of live and/or taped webcasts being transmitted from multiple networked sources.

Traditional television broadcasters have long had the ability to mix and switch analog transmissions from different and often remote locations into a single transmission that can be transmitted to a viewer who receives a transmission with a split screen and/or a screen with a picture within a picture (i.e., PIP) in which all of the pictures and sounds are time synchronized. This same type of time synchronization of multiple, independent data streams and manipulation of multiple streams into a single stream is demanded by end-users of streaming media. The tools to produce such programming are currently not available. Webcasters have responded by only broadcasting from one source (live or stored in memory) at a time and by generally allowing the broadcast media streams to include variable delays (appear jerky and lack time-based synchronization).

Another problem facing webcasters is that within the webcasting market, especially the video casting market, a large number of incompatible encoding and compression formats, hardware, and software have been developed (i.e., such as those developed by companies like Microsoft, RealNetworks, and VDO). This is significant because all webcasters employ some type of a compression and decompression (i.e., codec) scheme to deliver their streaming information over the communications networks at an acceptable data rate. Unfortunately, these various codec schemes are typically not compatible (for example, Microsoft's NETSHOW® computer program is incompatible with RealNetwork's REALMEDIA computer software Audio/Video standards), and end users are forced to download multiple media players (e.g., codec software) that are specific to the streaming media compression schemes they are receiving to make use of the streaming media. Presently, there are no effective tools that allow a webcaster to process, mix, and time-synchronize media streams encoded under different codec schemes to produce a combined output media stream or streams. This incompatibility of standards limits the ability of webcasters to effectively utilize the large breadth of sources of streaming media (i.e., webcast content) available when the webcasters are developing their webcasting products.

Consequently, there remains a need for methods and systems for providing time-based synchronization of media streams transmitted over a communications network from multiple, independent media sources. Preferably, such methods and systems will be capable of synchronizing media streams from two or more sources to allow sequential programming without gaps between streaming files. Additionally, it is preferable that the synchronization methods and systems allow combining, mixing, and switching of multiple media streams to produce output streams of data that are similar in quality (i.e., entertainment quality) and visual and audio effects as traditional television, such as mixing text, video, and audio, providing split and PIP screens, and the like. Additionally, it is preferable that such time-based synchronization methods and systems address the need for processing media streams from sources that utilize incompatible formatting and codec schemes.

SUMMARY OF THE INVENTION

To address the problems of variable transmission delays for digital data on communication networks, the invention generally provides a system that utilizes a streaming media synchronization system that manages the variable delay experienced by each media stream it receives. The synchronization system adjusts the received media streams to account for this variable delay and combines the multiple media streams into one or more composite streams. The composite streams may be a sequential series of the multiple streams starting and ending at edit points (such as at the top of the hour based on an external timing reference) without dead air or time gaps. Alternatively, the composite stream may comprise a mix of the multiple streams such that the previously independent streams are delivered concurrently in a variety of formats, including PIP and split screen. Significantly, these now interrelated streams are synchronized by transmittal times established at the media sources and not simply by when their packets are variably received at the synchronization system. This improvement is especially useful for webcasting live content over a communications network to synchronize the live content being transmitted from multiple sources located in potentially diverse geographic positions.

In one preferred embodiment of the invention, a method is provided for time-based synchronization of multiple media streams transmitted over a communications network by multiple, independent streaming media sources. The synchronization method includes receiving a first and a second media stream of data packets from first and second media sources. Upon receipt, timing data is parsed from the two media streams, and first and second transmission delay values are determined by comparing the parsed timing data with a reference time (e.g., a timing reference from an external source such as a global positioning satellite (GPS) timing signal). Combining the first and second media streams with an adjustment being made for the calculated transmission delay values creates a synchronized media stream. This synchronization method may further include transmitting a control or feedback signal to one or more of the media sources to control transmission variables such as stream length, transmission rate, and transmittal time to manage the variable delay at the media source rather than only at the receiving end. To accommodate for incompatible codec schemes, the method may include the step of decoding the first and second media streams into first and second intermediate media streams that are compatibly formatted to allow mixing of the streams and data packets.

According to one aspect of the invention, a synchronization system is provided for time-based synchronization of streaming media transmitted over a communications network. The system includes an input interface linked to the communications network for receiving from a first and a second media source a first and a second media stream that each include a plurality of data packets. Data buffers are provided for temporarily storing the data packets of the media streams. A time-based synchronization controller communicates with the data buffers to selectively retrieve the data packets of each stream to time-adjust the streams based on variable transmission delays computed by the controller for each stream. The two time-adjusted streams are passed to a streaming media processor that combines the streams into a composite, time synchronized media stream. In one embodiment, the first and second media streams include video packets that are compressed according to two differing, incompatible compression standards. A decoding device is provided between the input interface and the data buffers for decoding the two streams and formatting the streams into a first and a second intermediate media stream with compatible formatting (i.e., codec neutral schemes) that facilitates further processing and mixing. In one embodiment, the processor is configured to produce a composite stream in which the first and second media stream are connected sequentially with no time gap (i.e., dead air). Alternatively, the processor can be adapted to combine or mix the two streams into a composite stream for concurrent use of the data packets in the two streams (e.g., PIP, split screen, and the like for videobased media streams).

According to another significant aspect of the invention, an apparatus is provided for synchronizing media streams transmitted over a communication network and encoded according to incompatible compression standards. The apparatus includes an input interface linked to the communications network for receiving a first and a second media stream transmitted by a first and a second media source. The media streams comprise a plurality of data packets that are encoded according to a first compression standard and a second compression standard which are not compatible. A decoder is provided for decoding the first and second media stream to form a first intermediate media stream with a format that is compatible with the format of a second intermediate media stream. The apparatus further includes a streaming media processor for combining the first and second intermediate media streams into a composite media stream encoded according to an output compression standard (which may be the first or second compression standard or a different compression standard). In a preferred embodiment, the apparatus further includes a controller for determining a variable transmission delay for the first and second media streams based on transmission times of data packets in each stream compared with times of receipt of those same data packets at the apparatus. The controller then is operable to adjust the intermediate media streams based on the variable transmission times to create first and second time-adjusted streams.

Other features and advantages of the invention will be more fully understood from studying the drawings and the following description of particular embodiments of webcasting and time-based synchronization systems and methods according to the present invention.

DETAILED DESCRIPTION OF THE PREFERRED EMBODIMENTS

In general, the present invention provides a webcast system with time-based synchronization systems and methods designed to overcome the problem of non-deterministic and variable transmission delays or transmission times for streaming media transmitted from one node to another over a communications network (e.g., the Internet). In a packet-based network, each media stream comprises multiple packets and each packet may travel a different network path between source and destination nodes. Data transmission time periods vary amongst network paths and typically vary even for two data streams transmitted over the same network path depending on the timing of transmittal due to network traffic and changing capacities. In this regard, the invention enables a user to pull together and combine multiple, independent media streams (i.e., audio, video, text, and other media files comprising a plurality of data packets) originating from multiple media sources into a single, time-corrected media stream. The media sources may be located relatively close to the user's systems such as in the same building or may be located at any geographic location, and this variance in transmission distances (e.g., transmission path lengths) further contributes to the continually-changing nature of media transmission delays.

The invention involves determining transmission delays on an ongoing basis, performing a time-based adjustment of the delayed media streams, and then combining the multiple, time-adjusted media streams into one or more composite, time-synchronized (i.e., "synched") media streams or webcast signals. This combination of media streams is possible according to the invention even though the media streams may have been originally transmitted according to differing, incompatible compression or other formatting schemes and standards. The composite media streams may comprise a sequential organization of the time-adjusted media streams with careful control of edit points (i.e., the ending and beginning of media files) to control dead air or gaps between data packets. Alternatively, the composite media stream may produce two or more screens or windows by concurrently presenting two or more of the time-adjusted media streams to provide traditional television broadcasting effects of split screens and picture-in-picture (i.e., "PIP"). In this mode of operation, each of the concurrently presented media streams is synchronized with the other media streams to overcome delays and, thereby, provide a wholly-synched composite media stream, i.e., each window or screen is time-synchronized based on the same timing reference.

Figure 1:
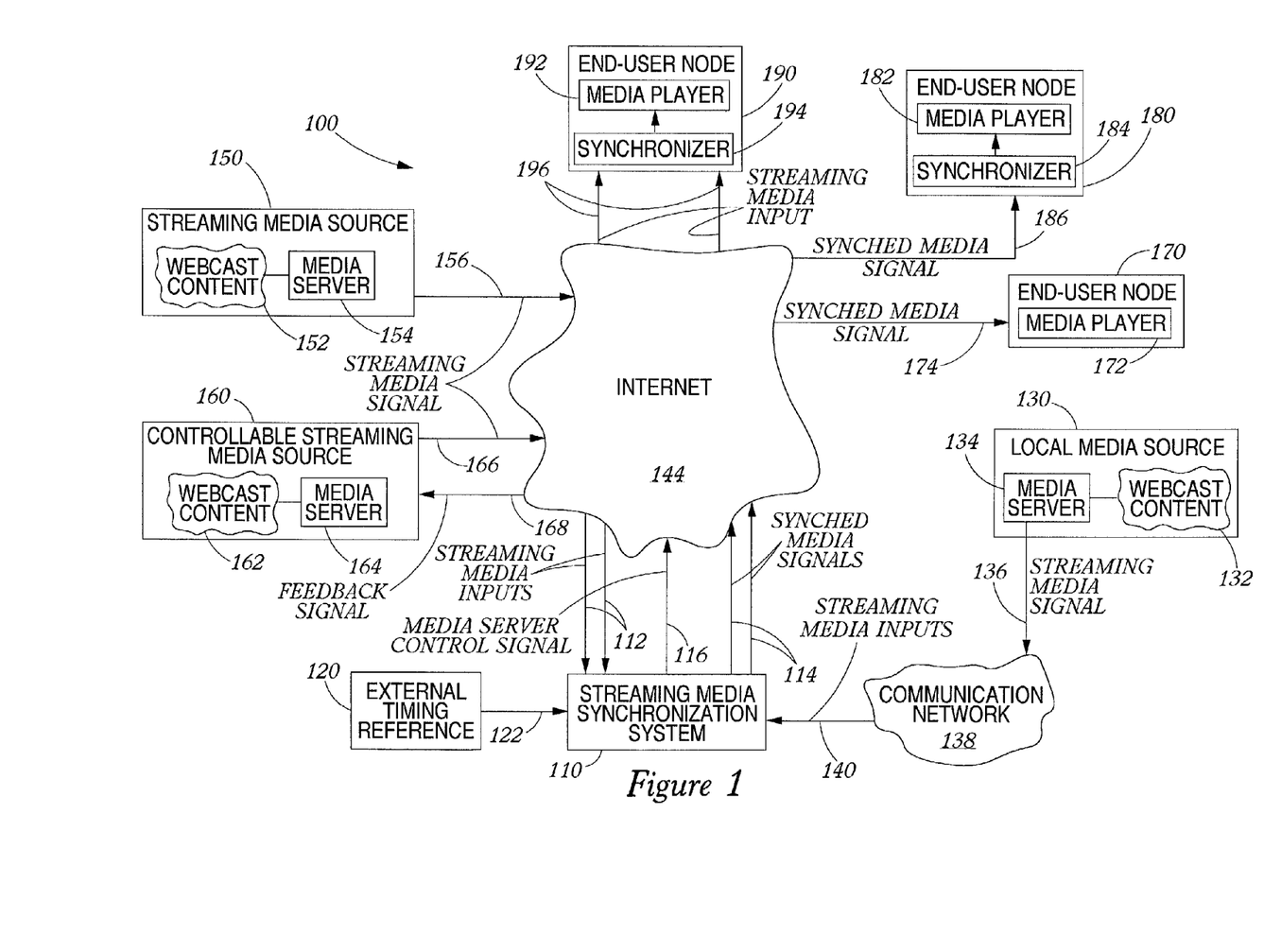
FIG. 1 is a functional block diagram of a webcast system including a streaming media synchronization system according to the present invention.

Referring now to FIG. 1, a webcast system 100 is illustrated that generally includes a number of media sources 130, 150, and 160 that communicate with a streaming media synchronization system 110 via a communication network 138 (such as a LAN, WAN, or the like) and the Internet 144. The input or webcast content 132, 152, 162 received from these sources 130, 150, 160 is processed into a composite media streams 114 to adjust for transmission variances and then transmitted to end-user nodes 170 and 180 (i.e., personal computers, Internet-ready televisions with or without set-top boxes, wireless Internet-linked electronic devices, and the like) for further use such as listening and viewing as is done with standard radio and television programming. It should be understood that the media sources 130, 150, 160 may be very simple devices such as personal computer systems configured for transmitting video, audio, or text files over the Internet 144 or may be more complex webcasting systems comparable to a remote or branch radio or television studio used in conventional broadcasting.

Local media source 130 represents a source within the same building or geographic vicinity as the streaming media synchronization system 110. As illustrated, the local media source 130 develops live and/or has stored in memory webcast content 132 and uses a media server 134 (e.g., a computer or server adapted for managing and dynamically controlling communication protocol with the linked communication network 138). The media server 134 configures the webcast content 132 into a streaming media signal 136 that comprises a plurality of data packets formatted to a specific compression standard, such as Netshow, RealVideo, or MPEG for video files, to increase the data transfer rate. The streaming media signal 136 is transmitted over the communication network 138, and the synchronization system 110 receives the digital information as a streaming media input 140. Because of the geographic proximity of the local media source 130 to the synchronization system 110, variable transmission delays in the communication network 138 are relatively small but still vary depending on the traffic on and bandwidth of the communication network 138.

Similarly, the streaming media sources 150 and 160 generate and/or supply webcast content 152 and 162 (such as live or real-time video/audio) that is formatted per compression and formatting standards into files comprising numerous data packets. Significantly, the compression and formatting standards utilized by the three media servers 132, 152, and 162 may be different standards which will most likely results in incompatible media streams (i.e., data packets that cannot be processed by a single media player software and/or cannot be directly combined into a single stream). The compressed data is transmitted as streaming media signals 156, 166 toward the synchronization system 110 over the Internet 144. Preferably, the media servers 154, 164 are configured to insert timing (e.g., transmittal time of certain data packets) and other control information (e.g., size and type of various files within the stream, originating source and programs, compression standards and protocols utilized, and the like) into the streaming media signals 156, 166 to enable a receiving node to parse or retrieve and use this information. While traveling over the Internet 144, the streaming media signals 156, 166 experience transmission delays due to congestion, varying capacities, router and other network equipment delays, and other transmission problems. The synchronization system 110 receives streaming media inputs 112 from the Internet 144 representing the delayed streaming media signals 156, 166 or input from other media sources (not shown).

Even if the streaming media signals 156 and 166 are transmitted at the same transmittal time, the variable transmission delays on the Internet 144 cause the streaming media signals 156 and 166 to arrive at a receiving node, such as the end-user node 190 or the streaming media synchronization system 110, at different times. If the signals 156 and 166 are combined without time-based adjustment, the webcast content 152, 162 will not be correctly time synchronized. This lack of synchronization is amplified or worsened as more and more media sources are utilized. For example, if the streaming media signal 136 from the local media source 130 is combined or mixed with the streaming media signals 156 and 166, the lack of synchronization caused by the variable transmission delays on the Internet 144 and the communication network 138 would most likely be noticeable as gaps in the data and/or jitters in such a unadjusted media stream.

Figure 2:
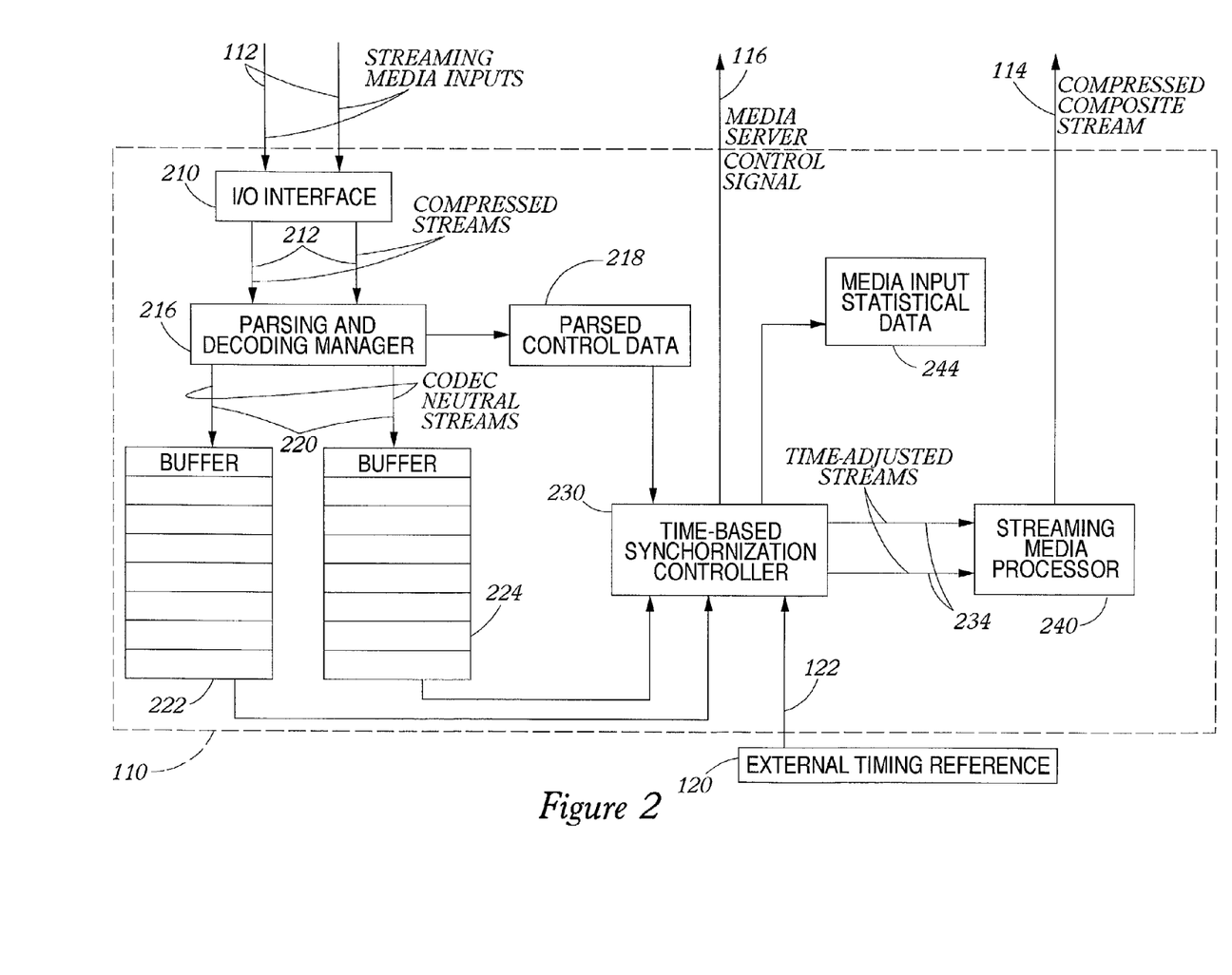
FIG. 2 is a functional block diagram of one preferred embodiment of the streaming media synchronization system of FIG. 1.

According to a significant feature of the invention, the webcast system 100 includes the streaming media synchronization system 110 that functions to receive multiple media streams and process the streams into a composite media stream that is time synchronized to overcome the problem of variable transmission periods for data packets (i.e., variable transmission delays). One embodiment of the streaming media synchronization system 110 is illustrated in FIG. 2.

Streaming media inputs 112 (such as the streaming media signals 156, 166 transmitted over the Internet 144 and the streaming media signal 136 transmitted over the communication network 138) are initially received by input/output (I/O) interface 210 (e.g., a front end processor and the like). In a preferred embodiment, the I/O interface 210 provides a communication link with communication networks 138, 144 and performs some initial disassembly and processing of the data packets in streaming media inputs 112, such as detecting and correcting of errors. The I/O interface 210 preferably also identifies a time of receipt for the data streams 112 and for at least certain data packets within the data streams 112 (such as the first and the last data packet within a stream). This time of receipt is computed with use of an external timing reference 120 (direct link not shown) and the time of receipt inserted into the outputted, compressed streams 212.

The compressed streams 212 (and otherwise formatted streams) are passed to a parsing and decoding manager 216. The parsing and decoding manager 216 comprises software and hardware configured to locate and remove timing and control information from the compressed streams 212. This parsed control data 218, including transmittal times or time stamps provided by the media sources 130, 150, 160 and time of receipt information from the I/O interface 210, is transmitted to a time-based synchronization controller 230 for use in time-based adjustments of the compressed streams 212, as explained in detail below.

In a preferred embodiment, the parsing and decoding manager 216 is configured to receive compressed streams 212 formatted under different, incompatible compression standards and formatting schemes and to output compatible or codec neutral streams 220. Generally, the manager 216 operates to decompress and decode each data packet in the compressed media streams 212 to determine its content. In part, this is accomplished by retrieving the parsed control data 218, which may include in headers the compression and formatting standards employed to format each of the streaming media inputs 112, and using this information to decompress and decode (e.g., demultiplexing) the data packets. In one embodiment, each of the compressed streams 212 is decoded and decompressed down to baseband level at which point the included digital data is compatible for mixing and combining (i.e., codec neutral). In another embodiment, each of the compressed streams 212 is decoded to a specific layer of the TCP/IP model or an intermediate level of decoding and decompression that is determined to be codec neutral to enable later combining and mixing of the data packets. This mode of intermediate level processing reduces processing time and processing capacity required by the parsing and decoding manager 216. The parsing and decoding manager 216 then places the data packets of the codec neutral streams in data buffers 222, 224 for temporary storage, typically in a first in first out manner. The buffers 222, 224 are shown as separate devices as a logical construct for ease of description but not as a limitation, and may be in one or more memory devices.

According to another important aspect of the invention, the time-based synchronization controller 230 comprises software and hardware configured to control the time correction or time-based adjustment of the codec neutral streams 220 to synchronize the two (or more) streams 220 and correct for the variances in transmission rates and timing. In one mode of operation, the controller 230 is adapted for addressing the variable transmission delay problem by performing operations and processing of the codec neutral streams 220 within the synchronization system 110. For example, the streaming media source 150, which has no feedback control features, transmits the streaming media signal 156 which experiences a transmission delay in the Internet 144 prior to being received at the synchronization system 110 by the I/O interface 210 as streaming media input 112. The controller 230 determines the transmission delay by comparing the transmittal time provided by the media source 150 in the parsed control data 218 with the receipt time provided by the I/O interface 210 with input from the external timing reference 120. The external timing reference 120 is preferably an accurate timing reference such as available through GPS systems and may be obtained with a GPS antennae and receiver (not shown).

In one embodiment of the invention, the transmission delay is determined once for a particular media stream 112, such as for the first received data packet. To provide time-based synchronization, the synchronization controller 230 is operated to manage the retrieval of data packets from the data buffers 222, 224 so as to correct for the determined transmission delays of the codec neutral streams 220. For example, if it is desired to mix two streams that have delays of 2 milliseconds and 15 milliseconds, the controller 230 would delay retrieval of the first data stream by 13 milliseconds to produce synchronization. The controller 230 then passes time-adjusted streams 234 to the streaming media processor 240 for mixing, switching, and other processing. Of course, this delay in retrieval would result in one of the buffers 222, 224 containing more data packets than the other buffer 222, 224, and the sizing of the buffers 222, 224 preferably is adequate for storing enough packets to adjust for anticipated transmission delays and differences in such delays between a number of streams.

In another preferred embodiment, transmission delays are determined periodically for each media stream to address the problem of varying delays within a streaming media file. This varying delay within a stream may cause a file to be transmitted slower or faster than anticipated by the synchronization system 110, which may lead to a particular file or "program" being longer or shorter in run time than anticipated. Although it may not be practical to determine the delay for each packet, the frequency of transmission delay is preferably frequent enough to provide acceptable time synchronization. Typically, longer files are sampled more times than shorter files, and media transmitted over less reliable pathways and networks are preferably sampled more frequently with less time between determinations. In this operating mode, the synchronization controller 230 determines the length of incoming streams or "programs" to determine if the program fills a time space allotted for that program.

For example, a webcaster may need a streaming media file to fill a 30 second commercial spot. The controller 230 is operable from the parsed control data 218 and the determined transmission delay for the streaming media input 112 to determine how long the streaming media file or commercial will run if placed within the compressed composite media stream 114. The controller 230 is then operable to retrieve the data packets of the codec neutral streams 220 from the data buffers 222, 224 in a manner that corrects for the slower or faster transmission rate of the data stream. In the above commercial example, if the transmission delay or transmission rate is causing a media stream 112 to be transmitted at a rate that would cause the commercial to be over thirty seconds in length or run time, the controller 230 is operable to retrieve data packets at a slightly faster rate such that the time-adjusted stream 234 would have a run time of thirty seconds, i.e., to achieve phase lock. This faster and slower retrieval function of the controller 230 can be compared with a physical flywheel in that it is preferable that the change in the rate of retrieval (and therefore, data delivery within the time-adjusted stream) be controlled to be smooth and not be too rapid to avoid noticeable jitters, jerks, and increases in speed in the streaming media product 114. This functionality may be achieved with hardware components including numerical accumulators and/or with software.

Note, this flywheel approach works to speed up or slow down delivery of a streaming media file, and it can be used for an entire streaming media input 112 or for portions of the input 112 to accommodate for variable transmission delay within a digital data file. Additionally, the speeding up and slowing down of the transmission rate of the streaming media input 112 can be done to chase edit points, i.e., the ending of another streaming media input 112 or program. For example, a program may be scheduled to end relatively soon but the next program has not arrived yet at the I/O interface 210. The controller 230 can, at least to a limited extent, slow down the withdrawal of data packets from the data buffers 222, 224 to in effect stretch a program or media files length or run time. The reverse technique can be used by the controller 230 to slow a later arriving streaming media input 112 or program that arrives too early. Of course, this speed control function of the controller 230 may be accomplished automatically by the controller 230 with input from the processor 240. Further, it may be preferable in some embodiments to have a manual or human-controlled override or input capability (not shown) to allow an operator to decide when and how to control this correction technique. In the above manner, the synchronization system 110 provides control over file transmission rate or length of run time for the file that provides a unique functionality. This length and transmission rate control is very useful for a user of the webcast system 100, especially one who is combining streaming media sequentially to provide a series of programs like those provided now in traditional television and radio broadcasting without dead air (i.e., data gaps).

According to another mode of operation, the synchronization system 110 is configured for controlling the delivery timing and rate of streaming media being transmitted to the I/O interface 210. Referring to FIGS. 1 and 2, the controllable streaming media source 160 transmits webcast content 162 with media server 164 as streaming media signal 166. After passing over the Internet 144 and experiencing a transmission delay, a streaming media input 112 is received at the synchronization system 110 at I/O interface 210. The synchronization controller 230 determines a transmission delay for the streaming media input 112 based on the transmittal time from the media source 160 and the receipt time at the I/O interface 210 contained in the parsed control data 218. In response, the synchronization controller 230 creates and transmits a media server control signal 116 to the controllable streaming media source 160 which is received as a feedback signal 168. The signal 116 may instruct the media server 164 to manage transmission of the streaming media signal 166 in a number of ways, including transmitting at different rate (e.g., quicker or slower), at a different time (such as for the next planned data file to account for the measured transmission delay), and/or using different TCP/IP protocol or compression standards. In this manner, the streaming media signal 166 can be time-adjusted in an ongoing (such as by transmitting a signal 116 every 1 to 10 milliseconds) and dynamic manner prior to being received at the synchronization system 110. The signal 166 can further be adjusted at the synchronization system 110 as discussed for streaming media signal 156 to account for changes in the transmission delay between the time of creating and transmitting the media server control signal 116 and transmitting the time-adjusted streaming media signal 166.

Referring to FIG. 2, the synchronization controller 230 is further operable to transmit the determined transmission delay and streaming media information (including media source and communication path information) as media input statistical data 244. Documentation of this information enables the synchronization system 110 to track delay rates from various media sources and for specific transmission paths over a communication network. This data 244 can be visually monitored (or audibly with alarms for too large a delay) directly by a user of the synchronization system 110 on a monitor or meter (not shown) or periodically by inspecting electronic output or hardcopy printouts. The data 244 is beneficial for planning a webcast in selecting media sources and pathways (including ISPs and the like) for transmitting streaming media. Further, this information can also be periodically provided (manually or automatically) to the media sources 130, 150, and 160 to facilitate transmission quality control and assurance.

The time-adjusted streams 234 are processed by the streaming media processor 240 to create a compressed composite stream or synched media signal 114, which is then transmitted over the Internet 144 to end-user nodes 170,180. The media stream 114 is typically compressed and formatted to a conventional compression standard depending on the type of media file (e.g., NETSHOW ® computer program by Microsoft Corporation for video streaming media). The streaming media processor 240 provides many of the functions provided by a switching device in television broadcasting, including switching between two or more signals (here time-adjusted media streams 234) to provide a sequential composite media stream 114 with no data gaps or dead air. This combining of the two time-adjusted media streams 234 involves determining the end of the first of the two streams and beginning the second of the two streams. In other words, the last data packet of the first stream is identified and the first data packet of the second data stream is positioned adjacent this last data packet within the composite stream 114. The processor 240 preferably is also adapted for providing fading out of one stream and then gradually fading into another stream without gaps or jerks in the new composite stream.

The processor 240 preferably is also configured to combine the time-adjusted streams 234 to present two or more media streams concurrently. For example, the composite stream 114 may comprise time-synchronized video media streams from two or more live webcasts that are combined so as to display the media streams in separate windows or screens. In this manner, split screen and PIP streaming media can be provided in a time-synchronized manner in the compressed composite stream 114.

Referring to FIG. 1, the time-synchronized media signals 114 are transmitted over the Internet 144. The composite streaming media may be received at a relatively simple end-user node 170 as a synched media signal 174. The end-user node 170 may be any electronic device capable of communicating with the Internet 144 or other communications networks and of processing the media stream for viewing and listening (or otherwise using the media stream). In this regard, the end-user node 170 typically includes a browser with a media player 172 selected for playing or processing the specific encoding standard utilized by the synchronization system 110 (e.g., REALPLAYER® computer software from RealNetworks, Inc. and the like).

Of course, the synched media signals 114 themselves will experience a variable transmission delay during transmission over the Internet 144. For example, a webcast that is scheduled to start at the top of the hour may be delayed and fail to be received at an end user location prior to its scheduled edit point or start time. If only one synchronization system 110 is transmitting streaming media, then a few milliseconds delay may not be significant. But, if the end-user node 180 is receiving synched media signals 186 from a number of sources (not shown) even such a small delay will result in noticeable and undesirable data gaps or dead air. To minimize dead air in this mode of operation, the end-user node 180 includes a synchronizer 184 that determines the transmission delay between the synchronization system 110 and the end-user node 180 and performs a time-based adjustment to re-synchronize the synched media signal 184. The synchronizer 184 may be configured to provide many if not all of the same functions as the streaming media synchronization system 110.

In another mode of operation for the webcast system 100, streaming media signals 156, 166 and/or synched media signals 114 are transmitted over the Internet 144 to an end-user node 190, which receives the network-delayed streaming media inputs 196. Because this end-user node 190 (e.g., a set-top box of a digital television or a personal computer system) receives streaming media from more than one source, it is desirable to include a synchronizer 194 to make time-based adjustments, as discussed in detail for the synchronization system 110. The synchronizer 194 may be configured to perform all of the functions that the synchronization system 110 performs, or, more preferably, is configured to perform a subset of the functions to control processing and memory needs and costs. For example, the synchronizer 194 may allow an end-user node 190 to view streaming media in split screen or PIP formats as is expected with conventional television equipment. To this end, the synchronizer 194 is adapted for receiving the streaming media inputs 196, determining a variable transmission delay for each input 196, time adjusting the inputs 196 based on the determined transmission delay, and then combining the time-adjusted streams in the selected viewing format. In one embodiment, because the streaming media inputs 196 often will have incompatible compression standards and/or formatting, the synchronizer 194 includes the functionality of the parsing and decoding manager 216 of the synchronization system 110 to allow the synchronizer 194 to create a codec neutral media stream that can be time-adjusted and then readily combined to form a composite media stream for processing by the media player 192.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the parsing and decoding manager 216, the time-based synchronization controller 230, and the streaming media processor 240 were illustrated as three separate devices in FIG. 2, but it should be understood that the functions of these components of the streaming media synchronization system 110 could be performed by one or more processing devices according to the invention.

I claim:

1. A synchronization system for time-based synchronization of streaming media transmitted over a communications network, comprising:

an input interface adapted for linking to the communications network to receive a first and a second media stream, wherein the first and second media streams comprise a plurality of digital data packets being transmitted over the communications network from a first and a second media source, respectively, and wherein the first and the second media streams each include a streaming video portion;

a first data buffer for storing the data packets of the first media stream;

a second data buffer for storing the data packets of the second media stream; and a controller communicatively linked to the first and the second data buffers for selectively retrieving the data packets of the first and second media streams to form a first and a second time-adjusted stream, wherein the controller determines a variable transmission delay for the first and the second media streams from the first and second media sources to the input interface and performs the selective retrieving based on the determined variable transmission delays;

wherein the controller is further configured for mixing the first and second time-adjusted streams into a composite media stream wherein the first and second time-adjusted streams are synchronized based on time.

2. The system of claim 1, wherein the streaming video portion of the first media stream is compressed based on a first compression format and the second media stream is compressed based on a second compression format, the second compression format differing from the first compression format.

3. The system of claim 2, further including a decoding device between the input interface and the first and second data buffers for processing compressed first and second media streams into a first decoded stream and a second decoded stream, respectively, for storage in the first data buffer and the second data buffer, wherein the first decoded stream and the second decoded stream have compatible formatting.

4. The system of claim 1, wherein the controller forms the composite media stream by combining the first and the second time-adjusted streams such that the second time-adjusted stream has a first data packet positioned at a start time adjacent a last data packet of the first time-adjusted stream positioned at an end time.

5. The system of claim 4, wherein the controller is communicatively-linked to an external timing reference for receiving a reference time value, and wherein the controller is adapted for using the reference time value to determine the start time and the end time.

6. The system of claim 4, wherein the controller determines a length of the first media stream, compares the length with the end time and the variable network delay, computes an edit length for the first media stream, and compresses or lengthens the first media stream to form the first time-adjusted stream, whereby the last data packet coincides with the end time.

7. The system of claim 1, further including a data parsing device in communication with the input interface configured for retrieving time data from the first and the second media streams and for transmitting the time data to the controller, wherein the controller uses the time data to determine variable transmission delays.

8. The system of claim 6, wherein the controller is adapted to create media server control signals based on the determined variable transmission delays and to transmit the signals over the communications network to the first and the second media sources to control transmission variables of the first and second media streams.

9. The system of claim 8, wherein the transmission variables are selected from a group consisting of transmission timing, transmission rate, and transmission length.

10. The system of claim 1, wherein the composite media stream comprises a streaming video portion having picture-in-picture or side by side portions formed with the data packets of the first and the second time-adjusted streams.

11. The system of claim 1, wherein the controller combines the first media stream and second media stream in the composite media stream such that a data packet transmitted in the first media stream from the first media source at a transmission time is matched with a corresponding data packet in the second media stream transmitted from the second media source at the transmission time.

12. The system of claim 11, wherein the combining is performed by the controller by selecting a transmission rate for the first and the second media streams to correct for the determined variable transmission delays.

13. The system of claim 1, further including an output interface for transmitting the composite media stream from the controller over the communications network and including an end-user node linked to the communications network for receiving the composite media stream wherein the end-user node comprises a synchronizer for determining a variable transmission delay between the controller and the end-user node and for performing time-based correction of the composite media stream to adjust for the variable transmission delay.

14. An apparatus for synchronizing media streams transmitted over a communication network, comprising:
    an input interface linked to the communications network and configured for receiving a first and a second media stream transmitted by a first and a second media source, respectively, wherein the first media stream comprises a plurality of data packets of a video stream encoded to a first compression standard and the second media stream comprises a plurality of data packets of a video stream encoded to a second compression standard differing from the first compression standard;
    a decoder for decoding the first and the second media streams into a first and a second intermediate media stream, respectively, wherein the first and second intermediate streams are compatibly formatted;
    a streaming media processor for mixing the first and the second intermediate-format media streams into a composite media stream encoded according to an output compression standard; and
    a controller in communication with the input interface and the streaming media processor adapted for determining a variable transmission delay for the first and the second media streams based on a transmission time for a data packet of the first media stream and a time of receipt at the input interface of the data packet and on a transmission time for a data packet of the second media stream and a time of receipt at the input interface of the data packet;
    wherein the controller is further configuring for selectively retrieving the first intermediate-format media stream and the second intermediate-format media stream based on the variable transmission delay of the first and the second media stream to create a first and a second time-adjusted stream;
    wherein the processor combines the first and the second time-adjusted stream to form the composite media stream with the first media stream data packets and the second stream data packets being positioned for concurrent delivery.

15. The apparatus of claim 14, wherein the time of receipt is determined based on a time reference signal received from an external timing reference.

16. A method for time-based synchronization of two or more media streams transmitted over a data communications network, comprising:
    receiving a first media stream wherein the first media stream comprising a plurality of data packets from one or more video files transmitted over the communications network by a first media source;
    receiving a second media stream wherein the second media stream comprising a plurality of data packets from one or more video files transmitted over the communications network by a second media source;
    retrieving timing data from the first and second media stream;
    comparing the timing data with a reference time to determine a first and a second transmission delay value;
    adjusting the first and the second media streams to correct for the first and the second transmission delay values, wherein the adjusting includes matching the data packets of the first and the second media streams based on transmittal times from the first and the second media sources;
    storing the data packets of the first media stream in a first data buffer and the data packets of the second media stream in a second data buffer and wherein the adjusting includes selectively retrieving the data packets of the first media stream from the first data buffer to correct for the first transmission delay value and selectively retrieving the data packets of the second media stream from the second butter to correct for the second transmission delay value
    creating a synchronized media stream by mixing the first and the second media streams, wherein the first and the second media streams are presented in the synchronized media stream concurrently.

17. The method of claim 16, wherein the adjusting includes creating a first and a second control signal in response to the first and the second transmission delay values, respectively, and includes transmitting the first and the second control signals to the first and the second media source to control transmittal of the first and the second media streams.

18. The method of claim 16, wherein the first media stream is encoded to a first compression standard and the second media stream is encoded to a second compression standard, and further including forming a first intermediate data stream by decoding the first media stream and forming a second intermediate data stream by decoding the second media stream, wherein the first and second intermediate data streams are compatibly formatted.

19. The method of claim 18, wherein the first compression standard differs from the second compression standard such that the first and second media stream are incompatible prior to the decoding to be combined into a single media stream.

20. The method of claim 16, wherein the synchronized media stream concurrently provides two screens corresponding to each of the first and second media streams.

21. The method of claim 20, wherein the two screens are arranged as split screens.

22. The method of claim 20, wherein the two screens are arranged as picture-in-picture with a first of the two screens provided within a second of the two screens.

23. The method of claim 16, wherein the first media stream comprises a first live webcast and the second media stream comprises a second live webcast.

* * * * *

UNITED STATES PATENT AND TRADEMARK OFFICE
CERTIFICATE OF CORRECTION

| | |
|---|---|
| PATENT NO. | : 7,346,698 B2 |
| APPLICATION NO. | : 09/742165 |
| DATED | : March 18, 2008 |
| INVENTOR(S) | : Hannaway |

It is certified that error appears in the above-identified patent and that said Letters Patent is hereby corrected as shown below:

Column 14, line 30, delete "butter" and insert therefor --buffer--.

Signed and Sealed this

Ninth Day of December, 2008

JON W. DUDAS
*Director of the United States Patent and Trademark Office*